United States Patent Office 2,730,486
Patented Jan. 10, 1956

2,730,486

ION EXCHANGE REMOVAL OF MERCAPTANS FROM PETROLEUM

Harry L. Coonradt, Woodbury, and Wilbur K. Leaman, Pitman, N. J., assignors to Socony Mobil Oil Company, Inc., a corporation of New York No Drawing. Application September 19, 1951, Serial No. 247,371

15 Claims. (Cl. 196—24)

The present invention relates to the treatment of mixtures of hydrocarbons contaminated by alkyl and aryl sulfhydryls, more particularly, to the removal of mercaptans from mixtures of hydrocarbons such as gasoline, naphtha, and the like by contact with ion-exchange material and especially to the regeneration of exhausted ion exchange material.

In the past the problem of separating alkyl and aryl sulfhydryls, more commonly called mercaptans, from mixtures of hydrocarbons has received the most attention by the petroleum industry. During the last two or three decades the petroleum industry has developed two methods of treating petroleum fractions for the removal, in contrast to mere conversion in situ to polysulfides, of mercaptans. In the one an aqueous or alcoholic solution of alkali metal hydroxide usually in conjunction with a solutizer, such as the alkyl phenols derived generally from cracked gasoline, or potassium isobutyrate, or naphthenic acids is used to extract the mercaptans from the petroleum fraction. When the extraction solution is so fouled with mercaptan that it is no longer an effective extraction agent, or continuously, the solution is regenerated by one of two methods. The solution can be regenerated by passing steam through the aqueous caustic solution and thereby steam-distilling the mercaptans, or a gas containing free oxygen can be passed through the fouled solution in the presence of a phenolic catalyst or oxidation promoter at atmospheric pressure or in the absence of such a catalyst at superatmospheric pressure and the mercaptans converted to polysulfides and the polysulfides separated from the regenerated solution by decantation.

In the second method for the removal of mercaptans, as contrasted to the conversion thereof to polysulfides in situ, the mercaptans can be extracted from the mixture of hydrocarbons by solid alkali metal hydroxide. This method also presents the problem of regeneration of the extraction medium.

While the latter method of extracting mercaptans from mixtures of hydrocarbons has not been utilized commercially to any great extent, the use of aqueous or alcoholic solutions of alkali metal hydroxide has been practiced widely by the petroleum industry. Technically, the various methods have been satisfactory but economically the results have not been such as to preclude search for other methods of attaining the goal. The chief drawback to liquid-liquid extraction of mercaptans is the energy requirements for regeneration of the fouled solution and the mechanical difficulty of separating the polysulfides from the regenerated solution. A further difficulty encountered in the oxidative regeneration of fouled solutions has been the necessity to retain a small amount of mercaptan in the regenerated solution.

The presence of the small amount of mercaptan in the regenerated solution limits the mercaptan concentration to which that of the hydrocarbons being treated can be lowered. The presence of polysulfide in the regenerated caustic solution increases the possibility that the polysulfide content of the hydrocarbons will be increased. Thus, it is manifest that the present methods of extracting mercaptans from hydrocarbons while useful are not completely satisfactory.

It has now been discovered that mercaptans can be removed from hydrocarbons by contact with ion-exchange material and that the regeneration of the fouled exchange material can be improved to such a degree to make the method industrially attractive and competitive with the prior art practice.

The refining of hydrocarbons is discussed on pages 370–371 of the book "Ion Exchange," F. C. Nachod, Academic Press Inc., N. Y. (1949). The patents cited therein suggest that exhausted anion exchange material can be regenerated by elutriation with aqueous solutions of alkali metal hydroxide. On pages 356 and 357 of the same publication in discussing the ion exchange recovery of alkaloids from aqueous solutions, variations in the regeneration of cation exchange material are mentioned, such as the use of ammoniacal alcohol as the regenerant and elution solvent. A variation discussed therein is that of regenerating the exchange material with aqueous caustic and elution of the alkaloid from the exchange material by cycling alcohol therethrough. In the pamphlet "Applications of Amberlite Ion Exchange Resins in the Petroleum Field," issued by Rohm and Haas Co., October 1949, it is suggested that resinous exchange material can be regenerated using anhydrous regenerants such as alcoholic solutions of alkali metal alkoxide, quarternary ammonium hydroxide, alkali metal hydroxide or organic amines for anion exchange material and glacial acetic acid or solutions of oil soluble sulfonic acids for cation exchange materials.

These methods when using aqueous alkali metal hydroxide solutions for regeneration of anion exchange materials require the use of the solution in large excess. That is to say the exhausted exchange material is treated with an excess of dilute aqueous alkali metal hydroxide solution as indicated by the following equation:

$$Ex \cdot OH \cdot RSH + \text{aqueous } MOH \rightleftharpoons Ex \cdot OH + RSM + H_2O$$

where $Ex \cdot OH \cdot RSH$ is a mercaptan-exhausted ion exchange material, $Ex \cdot OH$ is a regenerated anion exchange material, R is an alkyl or aryl group, RSH is a typical acidic compound and M is an alkali metal. Such a procedure is satisfactory from a technical viewpoint for regeneration of exchange material exhausted by mercaptans. The aqueous alkali metal hydroxide solution containing the alkali metal mercaptides (RSM) can then be regenerated by steam stripping or by oxidative methods. However, this is not entirely satisfactory from a standpoint of operational costs. First, it is necessary to use a multifold excess stoichiometrically (even 20 fold is insufficient) of aqueous alkali metal hydroxide solution (usually sodium hydroxide) in order to effect a complete or nearly complete regeneration. Furthermore, only rather dilute alkali metal hydroxide solutions, e. g., 2–10 per cent can be used. This necessitates the handling of large volumes of the regenerant solution which in turn requires large and expensive tanks, pumps and other equipment. On the other hand, to be competitive with other methods for the removal of mercaptans the alkali metal hydroxide solution must be regenerated and reused. Second, the cost of regenerating large quantities of spent dilute aqueous alkali metal hydroxide solution is excessive. Two methods of regenerating are in common usage: (1) air blowing the caustic solution at temperatures of 130°–160° F. to oxidize the mercaptides to polysulfides; and (2) steam stripping the aqueous solution. The heat requirements in both cases are very high when large volumes of water are involved as is the case in regenerating such very dilute spent caustic solutions.

Another disadvantage from the operational point of view in this method of regenerating ion exchange material used for mercaptan removal and of the regenerating of the spent dilute aqueous caustic solution is that these two regenerations are accomplished separately in different equipment. This increases the capital investment in that additional pumps, transfer lines, reactor tanks and storage tanks are required.

Similar, and generally analogous, disadvantages are also attached to the use of anhydrous regenerants such as alcoholic alkali.

In general, the present invention provides a new method of simultaneously regenerating both anion exchange material after use for the removal of mercaptans from a petroleum fraction and the aqueous caustic employed to regenerate the exchange material.

In the method of the present invention, the sour gasoline, i. e., containing mercaptans, is percolated through, or contacted with, the iron exchange material in any suitable manner until the anion exchange material is substantially exhausted, i. e., will no longer efficiently sorb mercaptans from a petroleum fraction containing mercaptans when contacted therewith. The ion exchange material is drained of gasoline and covered with dilute aqueous caustic solution. Air, scrubbed to remove carbon dioxide, is then passed through the slurry, preferably in an upward direction, of exhausted ion exchange material in dilute caustic solution. Two reactions take place simultaneously which are illustrated by the following equations:

(1) Ex—OH·RSH + MOH ⇌ Ex—OH + RSM + $H_2O$
(2) 2RSM + ½$O_2$(air) + $H_2O$ → RSSR + 2MOH where:

Ex—OH·RSH is a mercaptan-exhausted ion exchange material,
Ex—OH is a regenerated ion exchange material,
R is an alkyl or aryl group, and
M is an alkali metal.

The equilibrium of Equation 1 supra alone is to the left. That is why previously, amounts of alkali metal hydroxide in large excess of the mole equivalent of the mercaptan content of the exhausted exchange material were necessary to move the reaction to the right. However, when the alkali metal mercaptide (RSM) is oxidized to the polysulfide substantially as fast as it is formed, the net result of the two reactions is a rapid regeneration of the anion exchange material and a simultaneous regeneration of the alkali metal hydroxide.

Thus even less than mole equivalent amounts of alkali may be used. However, it is within the scope of the present invention to use a fraction of a mole equivalent up to several (e. g. 4) mole equivalents of alkali metal hydroxide per mole of mercaptan absorbed. When regeneration is completed, the polysulfide oil is separated in any suitable manner, for example, by decantation, and the regenerated alkali metal hydroxide separated from the regenerated anion exchange material in any suitable manner.

The primary advantages of the herein disclosed method of regenerating exhausted ion exchange material are (1) the need to use markedly less alkali and (2) the more economic regeneration of the alkali. A special advantage accruing from the present method of simultaneously regenerating anion exchange material and the regenerant is that only a small amount of caustic is required and therefore the same vessel is readily used for regeneration of exchange material and regenerant, thereby requiring fewer and smaller storage tanks, pumps, transfer lines and other equipment. Finally, labor and maintenance requirements are lessened and heat requirements are considerably reduced because only small volumes of liquid need be heated.

The efficacy of the method of the present invention is demonstrated by the following examples.

To determine the initial capacity of the anion exchange material for the removal of mercaptans from a petroleum fraction, about 1.8 volumes of Rohm and Haas anion exchange material sold under the designation XE–75 were used. Rohm and Haas XE–75 is a strongly basic type resinous anion exchange material available in the chloride form and convertible to the hydroxyl form by alkali before use. The anion exchange material was placed in a suitable upright cylindrical tube and a sour gasoline containing 0.10 weight per cent mercaptan sulfur was percolated through the bed at a liquid hourly space velocity 4. (A liquid hourly space velocity of 4 means that the volume of sour gasoline passed through the exchange bed per hour was 4 times the volume of the bed). The first 20 volumes of effluent gasoline had a mercaptan sulfur content of 0.0035 weight per cent and the average mercaptan sulfur content for the first 30 volumes was 0.0077 weight per cent.

1.8 volumes of Rohm and Haas anion exchange material XE–75 (a strongly basic anion exchange material in the hydroxyl form) were placed in an upright cylindrical container and sour gasoline containing 0.13 weight per cent mercaptan sulfur was percolated through the bed until the effluent gasoline was quite sour (0.045 weight per cent mercaptan sulfur). The exhausted exchange material bed was regenerated in situ, after draining residual sour gasoline therefrom, by covering the bed with 1.5 volumes of 2 weight per cent aqueous sodium hydroxide per volume of exchange material. Air, having been scrubbed with aqueous alkali to remove carbon dioxide, was passed upwardly through the aqueous alkali hydroxide-slurry of exchange material. Thereafter, the liquid mixture was removed and the exchange material was washed with distilled water; of course any substantially anion free water can be used, and this step may be omitted. Furthermore, an organic solvent for polysulfides such as gasoline may be used to remove residual polysulfides. A low molecular weight alcohol such as methanol, ethanol, propanol, isopropanol, amyl alcohol, fused oil and the like may be used to activate the resin as described in copending application Serial No. 247,372, filed simultaneously herewith. Sour gasoline was then passed through the bed of regenerated exchange material at a liquid hourly space velocity of 4. The first 20 volumes of effluent gasoline had an average mercaptan sulfur content of 0.0054 weight per cent mercaptan sulfur indicating that the exchange material had been regenerated.

It can be calculated readily that the regenerated exchange material which reduced the mercaptan sulfur in 20 volumes of gasoline from an initial 0.13 per cent to 0.0054 per cent would reduce the mercaptan sulfur of 26 volumes of gasoline from an initial 0.10 per cent to 0.0054 per cent. The capacity of the regenerated exchange material was essentially comparable to the fresh exchange material as is evident from the following comparison:

| Fresh Exchange Material | | Regenerated Exchange Material | |
|---|---|---|---|
| Volume of effluent | Percent RSH | Volume of effluent | Percent RSH |
| 20 | 0.0035 | | |
| 26 | [1] 0.0053 | 26 | [1] 0.0054 |
| 30 | 0.0077 | | |

[1] Calculated.

It was found that the 2.8 volumes of 2 per cent aqueous caustic soda solution, which in the present method is sufficient to regenerate 1.8 volumes of exhausted exchange material is insufficient to regenerate that volume of exhausted exchange material in the absence of simultaneous regeneration of the regenerant. Even 10 volumes of 4 per cent aqueous caustic soda solution was insufficient, without simultaneous regeneration of the regenerant, to regenerate the 1.8 volumes of exchange material because the mercaptan sulfur content of the first 10 volumes of gasoline effluent after such regeneration had only been reduced from 0.11 per cent to 0.014 per cent.

The temperature of regeneration can be within the range from ambient temperatures to that at which the exchange material softens or readily decomposes. This latter temperature for XE-75 and other Rohm and Haas strongly basic anion exchange materials is 140° F. The gas containing free oxygen employed for regeneration of the regenerant can be used at pressures from atmospheric to several hundred pounds per square inch.

The concentration of alkali employed can vary from 0.25 to 15 weight per cent alkali metal hydroxide and preferably is about 2 to about 10 weight per cent.

While the present method has been illustrated by the use of the strongly basic Rohm and Haas exchange material XE-75 it is manifest that other strongly basic anion exchange materials manufactured by the same or other manufacturers can be used since the method of regeneration is not dependent upon the particular exchange material used. Such strongly basic anion exchange materials are capable of substantially removing weak acids such as silicic and hydrocyanic acids, phenols and the like from aqueous solutions thereof. Representative of these materials are Rohm and Haas Co. resins IRA-400 and XE-75 and Dow Chemical Co. resins Dowex 1 and 2. A strongly basic ion exchange resin is neutralized in the range pH 10 whereas a weakly basic ion exchange resin is neutralized in the range of pH about 7 to 2. In general, a strongly basic ion exchange resin is one which on titration with hydrochloric acid in electrolyte free water has a pH above about 7.0 when the amount of hydrochloric acid added is one-half that required to reach the inflection point (equivalence point). A weakly basic ion exchange resin under the same conditions has a pH below about 7.0 when one-half of the acid required to reach the equivalence point has been added. The Rohm and Haas strongly basic resins can be adequately described as styrene copolymers chloromethylated and aminated to quaternary ammonium hydroxide materials. The Dow Chemical Co. strongly basic resins are quaternary amines with styrene-divinyl-benzene nuclei.

Since the present method is one for regenerating anion exchange material it is manifest that it is not limited to the regeneration of exchange material employed to remove mercaptans from hydrocarbon fluids but is useful in the regeneration of exchange material exhausted by the removal of mercaptans from aqueous as well as non-aqueous fluids. In other words, the present method can be used to regenerate any exchange material used for the removal of any ionic constituent, which when eluted off the exchange material with the required regenerating solution can then be oxidized or reduced to form an essentially non-ionic compound.

While the preferred regenerant is an aqueous alkali metal hydroxide solution it is manifest that alcoholic caustic solutions can be used. The removal of the polysulfide oil from the regenerated regenerant can be accomplished in the manner described in the prior art for separating polysulfides from alcoholic alkali metal hydroxide solutions.

Although it is preferred to remove substantially all of the carbon dioxide from the oxidizing gas passed through the regenerant this can be dispensed with when the ratio of equivalents of oxygen to carbon dioxide is great and the utilization of the oxygen is efficient.

We claim:

1. A method for regenerating anion exchange material exhausted with mercaptans which comprises contacting anion exchange material exhausted with mercaptans with a solution of alkali metal hydroxide whilst passing free oxygen-containing gas through said solution.

2. A method for regenerating anion exchange material which comprises contacting anion exchange material exhausted with mercaptans with aqueous alkali metal hydroxide solution containing about 0.25 to about 15 weight per cent alkali metal hydroxide whilst passing gas containing free oxygen through said solution.

3. A method for regenerating anion exchange material which comprises contacting anion exchange material exhausted with mercaptans with aqueous alkali metal hydroxide solution containing about 2 to about 10 weight per cent alkali metal hydroxide whilst passing gas substantially devoid of carbon dioxide and containing free oxygen through said solution.

4. The method of regenerating anion exchange material exhausted with mercaptans as described and set forth in claim 3 wherein the temperature during regeneration is less than the decomposition temperature of the exchange material.

5. The method of regenerating anion exchange material which comprises contacting anion exchange material exhausted with mercaptans, with an aqueous alkali metal hydroxide solution whilst passing gas substantially free from carbon dioxide and containing free oxygen through said solution to oxidize mercaptides to polysulfides, separating said polysulfides from regenerated regenerant, and contacting exhausted anion exchange material with said regenerated regenerant.

6. A method for regenerating anion exchange material which comprises contacting anion exchange material exhausted with mercaptans extracted from a hydrocarbon mixture thereof with an aqueous alkali metal hydroxide solution whilst passing gas substantially free from carbon dioxide and containing free oxygen through said solution.

7. A method for regenerating anion exchange material which comprises contacting anion exchange material exhausted with mercaptans extracted from a petroleum oil fraction with aqueous alkali metal hydroxide solution whilst passing a gas substantially free from carbon dioxide and containing free oxygen through said solution, separating regenerated anion exchange material from aqueous alkali metal hydroxide solution and polysulfides, separating polysulfides from said aqueous alkali metal hydroxide solution, and contacting anion exchange material exhausted with mercaptans with said separated aqueous alkali metal hydroxide solution.

8. A method for regenerating anion exchange material which comprises contacting anion exchange material exhausted with mercaptans extracted from gasoline with aqueous alkali metal hydroxide solution whilst passing gas containing free oxygen through said solution.

9. A method for regenerating anion exchange material which comprises contacting anion exchange material exhausted with mercaptans extracted from gasoline with aqueous alkali metal hydroxide solution whilst passing gas containing free oxygen through said solution, separating said solution from said exchange material, and washing said exchange material with water.

10. The method for regenerating anion exchange material as described and set forth in claim 9 wherein the gas containing free oxygen is substantially devoid of carbon dioxide.

11. The method for regenerating anion exchange material as described and set forth in claim 9 wherein polysulfides are separated from regenerated regenerant, and contacting exhausted anion exchange material with said regenerated regenerant.

12. The method for regenerating anion exchange material which comprises contacting anion exchange material exhausted with mercaptans with a basic regenerant solution whilst passing gas containing free oxygen through said regenerant solution.

13. A method for removing mercaptans from hydrocarbons which comprises contacting hydrocarbons mixed with mercaptans with anion exchange material, separating anion exchange material from treated hydrocarbons, contacting said separated anion exchange material with a basic regenerant solution whilst passing gas substantially free from carbon dioxide and containing free oxygen through said regenerant solution to convert mercaptans to polysulfides, separating regenerated regenerant solution from regenerated anion exchange material, washing said separated anion exchange material with water, and contacting hydrocarbons admixed with mercaptans with said regenerated anion exchange material.

14. A method for regenerating anion exchange material which comprises contacting anion exchange material exhausted with mercaptans extracted from gasoline with aqueous alkali metal hydroxide solution whilst passing gas containing free oxygen through said solution, separating said solution from said exchange material, and washing said exchange material with low molecular weight alcohol.

15. A method for regenerating anion exchange material which comprises contacting anion exchange material exhausted with mercaptans extracted from gasoline with aqueous alkali metal hydroxide solution whilst passing gas containing free oxygen through said solution, separating said solution from said exchange material, and washing said exchange material with organic solvent for polysulfides.

References Cited in the file of this patent

UNITED STATES PATENTS

| | | |
|---|---|---|
| 2,324,927 | Heilman | July 20, 1943 |
| 2,365,993 | Apgar | Dec. 26, 1944 |
| 2,474,028 | Berger | June 21, 1949 |
| 2,556,438 | Parker | June 12, 1951 |
| 2,585,652 | Hartough | Feb. 12, 1952 |

OTHER REFERENCES

Ott: Cellulose and Cellulose Derivatives, Interscience, 1943, pages 224, 827 and 838.

Amber-hi-Lites, No. 4, November 1949.